United States Patent [19]
Uno et al.

[11] 3,810,202
[45] May 7, 1974

[54] LIGHT-MEASURING METHOD AND STRUCTURE FOR CAMERAS

[75] Inventors: Naoyuki Uno, Kawagoe-shi; Tadazumi Sakazaki, Tokyo, both of Japan

[73] Assignee: Asahi Kogaku Kogyo Kabushiki Kaisha, Tokyo-to, Japan

[22] Filed: Nov. 27, 1972

[21] Appl. No.: 309,779

[30] Foreign Application Priority Data
Dec. 1, 1971   Japan.............................. 46-97499

[52] U.S. Cl............ 95/10 CT, 95/10 CE, 95/10 PO
[51] Int. Cl. ............................................. G03b 7/08
[58] Field of Search......... 95/10 CE, 10 CT, 10 PO; 352/141

[56] References Cited
UNITED STATES PATENTS
3,486,814   12/1969   Kubsta............................... 352/141
3,633,473   1/1972   Yashuhiro............................. 95/10

Primary Examiner—Samuel S. Matthews
Assistant Examiner—Michael L. Gellner
Attorney, Agent, or Firm—Steinberg & Blake

[57] ABSTRACT

A method and structure for measuring the light travelling through the objective of a single lens reflex camera. A photosensitive unit is situated adjacent a viewfinder of the camera for receiving not only light which travels along a first path through the objective of the camera but also light which travels along a second path through the eyepiece of the viewfinder. The light which travels along one of these paths is treated by being subjected to the action of a light-chopper, so that the photosensitive unit provides an AC signal from the chopped light and a DC signal from the light which is not chopped. These two signals are superimposed and the superimposed signals are subjected to the action of a suitable filter which extracts from the superimposed signals only the light travelling through the objective. Also, it is possible for the AC signal to be rectified and then to achieve the signal corresponding to the light travelling through the objective by subjecting the rectified AC signal and the remaining DC signal to the action of a differential amplifier.

11 Claims, 9 Drawing Figures

LIGHT-MEASURING METHOD AND STRUCTURE FOR CAMERAS

BACKGROUND OF THE INVENTION

The present invention relates to cameras.

In particular, the present invention relates to single lens reflex cameras.

As is well known, superior results have already been achieved by utilizing in single lens reflex cameras a light measuring system capable of measuring the light which travels through the objective of the camera. The light which has already travelled through the objective is received by a photosensitive element and a corresponding electrical signal is used as an input to a unit such as a light-measuring value indicator or to an automatic exposure control system capable of controlling a shutter of the camera.

Serious difficulties have been encountered with systems of the above type, however, by reason of the fact that stray light enters through the eyepiece of the viewfinder and reaches the photosensitive element so as to introduce an inaccuracy in the measurement of the light travelling through the objective.

Various measures have already been proposed to eliminate this latter drawback. For example it has been proposed to provide a light shield in the path of light entering through the eyepiece of the viewfinder, this light shield being situated adjacent the eyepiece when the operator does not look through the eyepiece into the viewfinder or when measurement of light is not being carried out. Also it has been proposed to utilize a deflector plate which is adapted to control the transmission of a particular light component and which is located in front of the eyepiece of the viewfinder so as to prevent the light entering through the eyepiece from reaching the operative surface of the photosensitive element.

However, both of the above measures have proved to be of little practical value since the light shield expedient is inconvenient in that there is still a possible influence of stray light entering through the eyepiece of the viewfinder upon the resulting measurement of light, and this influence cannot be effectively prevented during the time when the operator is looking into the viewfinder through the eyepiece. A further disadvantage is that the visual field of the viewfinder is disadvantageously shaded during the light measurement operation. The use of the deflector presents a technical difficulty with respect to maintaining the desired sensitivity of the photosensitive element inasmuch as the visual field of the viewfinder is darkened through this expedient and the total light amount which incident upon the photosensitive element is undesirably lowered.

Thus, expedients of the above type limit both the light coming from the photographed object to the photosensitive element and the stray light entering through the viewfinder eyepiece by way of utilizing suitable optical means before the light reaches the operative surface of the photosensitive element.

SUMMARY OF THE INVENTION

It is accordingly a primary object of the present invention to provide a method and structure which will avoid the above drawbacks.

In particular, it is an object of the present invention to avoid the above drawbacks without requiring the use of light shields, optical elements, or the like to influence the light which enters through the eyepiece of the viewfinder.

Thus, it is an object of the present invention to provide a structure and method which are capable of achieving a highly accurate measurement of the light which travels through the objective of the camera without in any way interfering with the light which enters through the eyepiece of the viewfinder.

It is especially an object of the present invention to provide a method and structure capable of treating either the light entering through the objective or the light entering through the eyepiece of the viewfinder in such a way that different signals are provided by the light travelling along these paths, respectively, with the different signals being further handled in such a way that inaccurate measurement of the light travelling only through the objective is achieved.

According to the method of the invention light passing through the objective travels along a first path to a photosensitive means while light entering through the eyepiece travels along a second path to the photosensitive means, and the light travelling along one of these paths is treated so as to provide at the photosensitive means different signals for the light travelling along the first and second paths, respectively, and these signals are combined with the method including the step of extracting from the combined signals only that signal which corresponds to the light travelling through the objective of the camera.

With the structure of the invention there is provided across one of the above first and second light paths a light-chopper means which provides at the photosensitive means an AC signal from the light travelling through the light-chopper means, while the light travelling along the other path provides a DC signal, and these two wave forms are combined and passed through a suitable filter means which extracts from the combined superimposed wave forms only that signal which corresponds to the light travelling through the objective of the camera. Also it is possible to provide rectification of the AC signal and then to differentiate between the resulting recitified signal and the DC signal in order to determine the measurement of the light travelling only through the objective.

Thus, according to the present invention there is an improved method and structure for measuring light in order to effectively prevent the result of measurement in an electrical manner from being adversely influenced by stray light which enters through the eyepiece of the viewfinder so as to solve in this way all operational and technical problems encountered with conventional structures.

BRIEF DESCRIPTION OF THE DRAWINGS

The invention is illustrated by way of example in the accompanying drawings which form part of this application and in which.

DESCRIPTION OF PREFERRED EMBODIMENTS

Figures 1A, 1B:
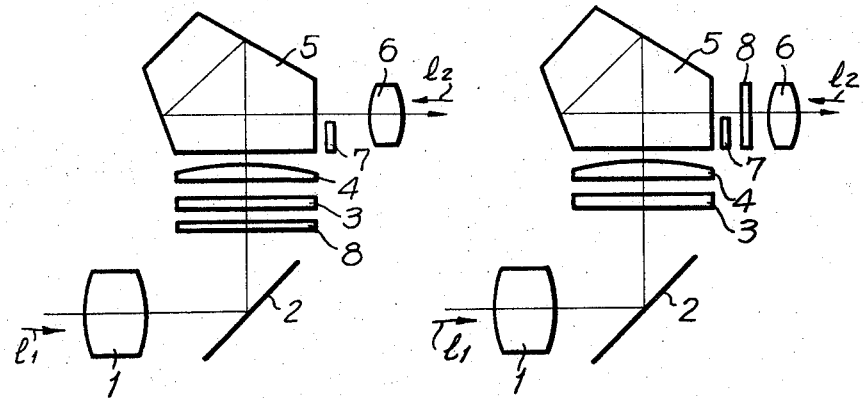
FIG. 1A is a schematic representation of one possible method and apparatus according to the invention.
FIG. 1B is a schematic representation of another possible method and apparatus according to the present invention.

Referring first to FIG. 1A, there is schematically represented therein the manner in which light $1_1$ enters through an objective means 1 of a single lens reflex camera to be reflected by the tiltable mirror 2 up to the viewfinder means which includes the focal plate 3 on which the image from the mirror 2 is focussed. This image which is thus focussed on the focal plate 3 is visually observed by way of a Fresnel lens 4 and an eyepiece lens 6 of the viewfinder means which further includes the pentaprism 5 interposed between the Fresnel lens 4 and the eyepiece 6.

A photosensitive means 7 in the form of any conventional light-responsive structure such as a suitable photocell or cadmium sulfide resistor is situated between the pentaprism 5 and the eyepiece 6 of the viewfinder means, although in the actual construction there may be a pair of photosensitive elements 7 respectively situated on opposite sides of the optical axis of the eyepiece 6 and having their operative surfaces exposed to the light-exit surface of the prentaprism 5. It will be noted that stray light $1_2$ enters through the eyepiece 6 so that this stray light will also provide from the prentaprism 5 an influence on the photosensitive means 7.

In accordance with the present invention a light-chopper means 8 is provided for treating the light which travels along one of the light paths, these light paths being either the light path through the objective means 1 or the light path through the eyepiece 6. In the example of FIG. 1A the light-chopper means 8 is situated across the path of travel of the light $1_1$ which passes through the objective means 1. However, in the case of FIG. 1B, all of the parts shown in FIG. 1A are the same except that in the case of FIG. 1B the light-chopper means 8 is situated across the path travelled by the light $1_2$ which enters through the eyepiece 6 of the viewfinder means.

Figure 4:
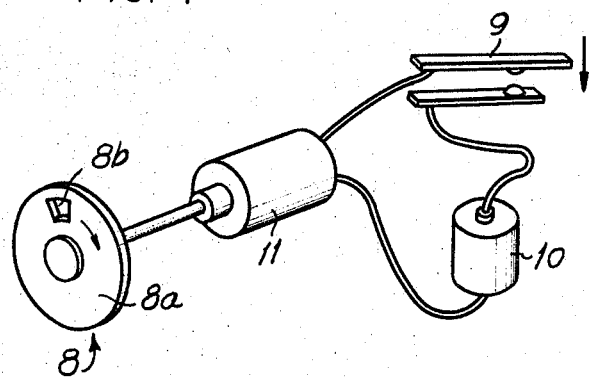
FIG. 4 is a diagrammatic perspective illustration of a light-chopper means utilized with the method and apparatus of the invention.

Referring to FIG. 4, it will be seen that the light-chopper means 8 may be in the form of a rotary disc 8a formed with an aperture 8b which travels across the path of light once during each revolution of the disc 8a. The disc 8a may be driven from the shaft of an electric motor 11 which receives its energy from a battery 10 which is closed by way of a normally open switch 9. This switch 9 is arranged to be closed during the initial part of the depression of a plunger which is depressed by the operator in order to make an exposure. Thus, FIG. 4 shows one specific arrangement of a possible light-chopper which may be used with the invention although it is evident that the chopper means 8 may be constructed in other ways such as as a blind type of light interrupting system, an iris diaphragm type of system, or a crystal plate type of system. Thus, with the arrangement shown in FIG. 4, the circle along which the aperture 8b travels intersects the path of light $1_1$ in the case of FIG. 1A or the path of light $1_2$ in the case of FIG. 1B, so that in the case of FIG. 1A intermittent light pulses will reach the photosensitive means 7 from the objective means 1 while in the case of FIG. 1B intermittent light pulses will reach the photosensitive means 7 from light which enters through the eyepiece 6.

Figure 2A:
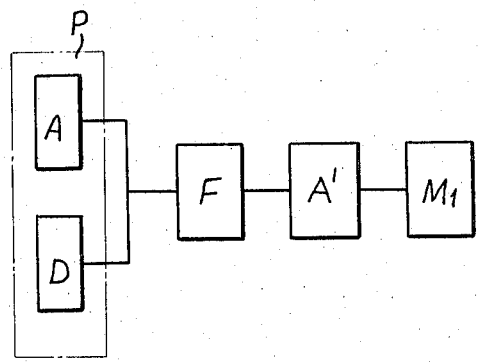
FIG. 2a is a block diagram schematically representing an electrical system utilized for the embodiment of FIG. 1A.

Referring to FIG. 2a, there is shown in the block diagram thereof an electrical system which is used with the embodiment of FIG. 1A. Thus, at the light-receiving station or photosensitive means P made up of the photosensitive elements 7 there are developed an AC component A and a DC component D, the AC component being provided by way of the chopped light which reaches the photosensitive means after travelling through the objective means while the DC component is formed by the light which enters through the eyepiece 6. It will be seen that in FIG. 2b the same components are developed at the photosensitive means P, but in this case which corresponds to the embodiment of FIG. 1B, the AC component A is developed from the light $1_2$ which enters through the eyepiece 6 and which is subjected to the action of the light-chopping means 8, while the DC component D is provided by way of the light which is not interrupted and which travels through the objective means 1. With the systems of FIGS. 2a and 2b both of the AC and DC signals are combined by being superimposed on each other, and in the case of FIG. 2a the superimposed signals are transmitted to a filter circuit means F which functions to transmit only the AC component A to an amplifier means A' from which the AC component is delivered to a light-measurement value-indicating means $M_1$ which may take the form of a suitable meter. Since with the system of FIG. 2a which corresponds to the embodiment of FIG. 1A the AC component corresponds to the light travelling through the objective means 1, it will be seen that with this system the influence of the DC component is eliminated and thus the means $M_1$ will measure only the light travelling through the objective means 1.

Figure 2B:
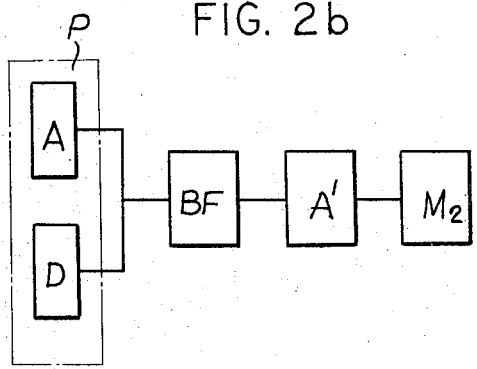
FIG. 2b is a block diagram schematically representing an electrical system utilized with the embodiment of FIG. 1B.

However, in the case of FIG. 2b it is the DC component D which is developed at the photosensitive means P by way of the light travelling through the objective means 1 while the AC component A is developed by way of the light which enters through the eyepiece 6, this system of FIG. 2b corresponding to the embodiment of FIG. 1B, as pointed out above. With this embodiment also the signals are superimposed and in this case they are applied to an electrical means which includes the band-pass filter BF which transmits only the DC component D to the amplifier A' from which the signal is then transmitted to the means $M_2$ which gives an indication of the amount of light travelling through the objective means 1.

Figure 2C:
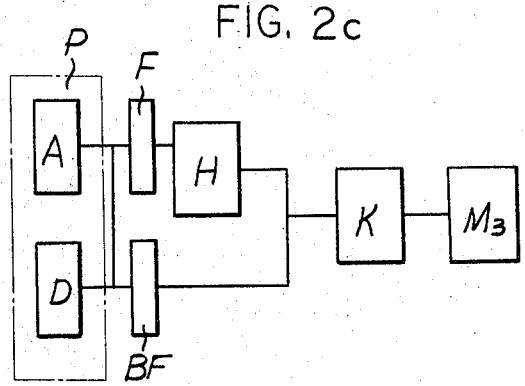
FIG. 2c is a block diagram schematically representing an electrical system capable of being used with either of the embodiments of FIGS. 1A and 1B.

The system illustrated in FIG. 2c is capable of being utilized with either of the embodiments of FIGS. 1A and 1B. Thus, with this system the superimposed AC and DC signals are divided while passing through a filter F and a band-pass filter BF of the electrical means of this embodiment. The AC component which is transmitted by the filter F is rectified by way of a rectification circuit means H, while the band-pass filter BF transmits the DC component. Thus, the transmitted DC component and the rectified AC component are combined and transmitted to a differential amplifier means K of the electrical means of the embodiment of FIG. 2c, so that the differential between the two signals is determined and amplified before being transmitted to the indicating means $M_3$ in the form of a suitable indicator for directly indicating the value of the light travelling through the objective.

Figure 3A:
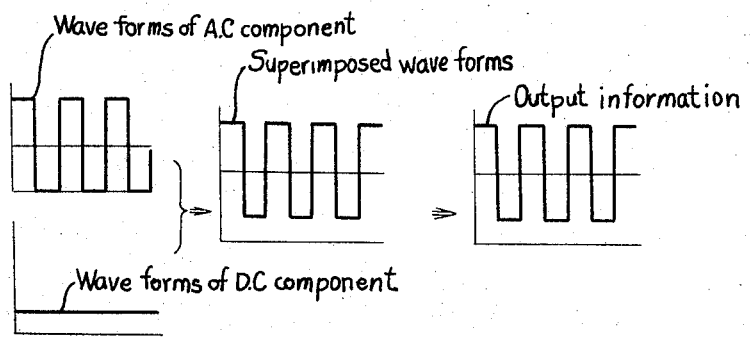
FIGS. 3a–3c are respectively wave-form diagrams illustrating the manner in which the embodiments of FIGS. 2a–wc respectively operate.

FIG. 3a illustrates the operation of the system of FIG. 2a. Thus the wave forms of the AC and DC components are superimposed and by way of the filter means F the output has the AC wave form corresponding to the light entering through the objective.

Figure 3B:
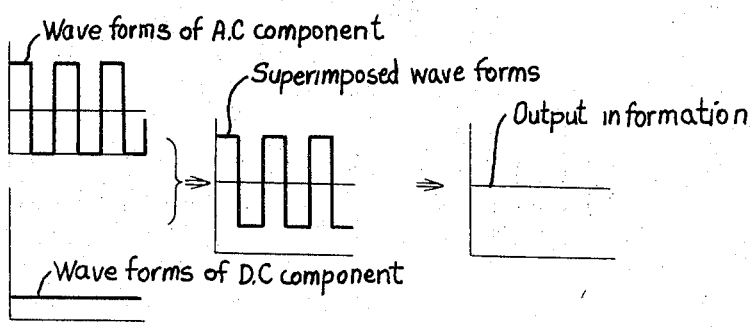

In FIG. 3b, the manner in which the system of FIG. 2b operates is illustrated. Thus in this case also the AC and DC wave forms are superimposed, but by way of the band-pass filter BF the output is in DC form corresponding to the light travelling through the objective means of FIG. 1B.

Figure 3C:
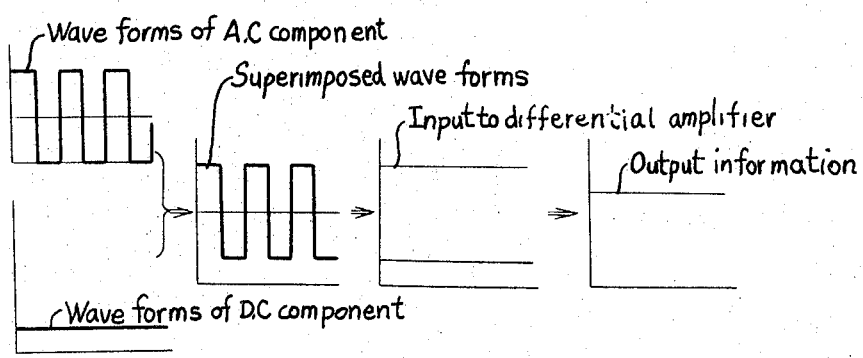

With respect to FIG. 3c, which illustrates the manner of operation of the embodiment of FIG. 2c, it will be seen that the AC and DC wave forms are again superimposed, but because of rectification of the AC wave form there are a pair of DC inputs to the differential amplifier means K which delivers the output corresponding to the light entering through the objective to the meter means $M_3$, as pointed out above.

Thus, with the present invention any possible adverse influence resulting from light entering through the eyepiece of the viewfinder means can be effectively prevented. Thus, by way of the light-chopping means 8 either the light entering through the objective or the light entering through the eyepiece is changed to intermittent light which is received together with the continuous light by the light-receiving station or photosensitive means, and the superimposed signal obtained by superimposing the AC and DC components is divided in the manner indicated above so as to achieve a light measurement corresponding only to the light entering through the objective means. Of course, while in the above-described embodiments the light measurement is provided by way of a suitable indicating means, it is possible also to utilize the electrical quantity corresponding to the light entering through the objective in order to participate in the operations of an automatic circuit for automatically determining exposure time.

With the present invention operational as well as technical problems are fewer than has heretofore been the case with conventional structures for solving the problems solved by the present invention, and in addition the accuracy of light measurement is higher than with conventional structures for attempting to prevent the influence of stray light entering through the eyepiece of the viewfinder inasmuch as with the present invention an electrical system of high efficiency replaces the conventional optical expedients.

What is claimed is:

1. In a method for measuring light entering through the objective of a single lens reflex camera having a photosensitive means receiving the light entering through the objective and travelling along a first path as well as light entering through an eyepiece of a viewfinder and travelling along a second path, the steps of treating the light travelling along one of said paths to provide at said photosensitive means from the thus-treated light a signal different from that derived from the light travelling along the other of said paths, superimposing the latter two signals upon each other, and extracting from the superimposed signals a signal corresponding to the light travelling through the objective, so that the influence of light entering through the eyepiece of the viewfinder is eliminated.

2. In a method as recited in claim 1 and including the step of indicating the value of the light entering through the objective by utilizing the signal extracted from the superimposed signals.

3. In a method as recited in claim 1 and wherein the treating of the light which travels along said one path involves chopping the light travelling along said one path to treat the light travelling along said one path to provide therefrom at said photosensitive means an AC signal, while the light travelling along said other path provides at said photosensitive means a DC signal.

4. In a method as recited in claim 3 and wherein the light chopping takes place at said first path to provide the AC signal from the light which travels through the objective, and the extracting of the signal corresponding to the light travelling through the objective being obtained by a filtering which transmits only the AC signal.

5. In a method as recited in claim 3 and wherein the light chopping takes place at said second path to provide the AC signal from the light entering through the eyepiece of the viewfinder, and the extracting of the signal corresponding to the light travelling through the objective being achieved by a band-pass filtering action which transmits only the DC component of the superimposed signals.

6. In a method as recited in claim 3 and wherein the AC component is rectified and the difference between the two signals then being determined to achieve elimination of the influence of light entering through the eyepiece of the viewfinder.

7. In a single lens reflex camera, viewfinder means having an eyepiece, objective means and reflector means for directing light along a first path through said objective means to be reflected by said reflector means to said viewfinder means, so that the operator may see an image of the object to be photographed when looking into the viewfinder through said eyepiece thereof, photosensitive means situated adjacent said viewfinder means for receiving the light which travels along said first path as well as for receiving light travelling along a second path through said eyepiece of said viewfinder means, light-chopper means extending across one of said paths for chopping the light travelling therealong to provide at said photosensitive means from the light travelling along said one path an AC signal while the light travelling along the other of said paths provides at said photosensitive means a DC signal, said photosensitive means superimposing both of said signals upon each other to combine said signals, and electrical means electrically connected with said photosensitive means for extracting from the superimposed signals that signal which corresponds only to the light travelling through said objective means.

8. The combination of claim 7 and wherein an electrical indicating means is electrically connected with said electrical means for indicating the light travelling through said objective means.

9. The combination of claim 7 and wherein the light-chopper means is situated across said first path, so that the AC signal is produced by light travelling through said objective means, and said electrical means being a filter which transmits only the AC component of the superimposed signals.

10. The combination of claim 7 and wherein the light chopper means is situated across said second path, and said electrical means being a band-pass filter which transmits only the DC signal corresponding to the light travelling through the objective means.

11. The combination of claim 7 and wherein said electrical means includes a rectifier which rectifies the AC signal and a differential amplifier which transmits the difference between the rectified AC component and the DC component, so that the latter difference corresponds to the light travelling through the objective means.

* * * * *